C. O. PEARSON.
ELECTRIC AND FLUID PRESSURE CONTROLLER FOR INTERNAL COMBUSTION ENGINES.
APPLICATION FILED AUG. 17, 1908.

997,003. Patented July 4, 1911.
5 SHEETS—SHEET 1.

Fig. 1.

WITNESSES:

INVENTOR

BY

ATTORNEY

C. O. PEARSON.
ELECTRIC AND FLUID PRESSURE CONTROLLER FOR INTERNAL COMBUSTION ENGINES.
APPLICATION FILED AUG. 17, 1908.

997,003.

Patented July 4, 1911.

WITNESSES:

INVENTOR

BY

ATTORNEY mark># UNITED STATES PATENT OFFICE.

CHARLES O. PEARSON, OF NEW YORK, N. Y.

ELECTRIC AND FLUID-PRESSURE CONTROLLER FOR INTERNAL-COMBUSTION ENGINES.

997,003.  Specification of Letters Patent.  Patented July 4, 1911.

Application filed August 17, 1908. Serial No. 448,877.

*To all whom it may concern:*

Be it known that I, CHARLES O. PEARSON, a citizen of the United States, and a resident of the borough of Brooklyn, in the county of Kings, city and State of New York, United States of America, have invented certain new and useful Improvements in Electric and Fluid-Pressure Controllers for Internal-Combustion Engines, of which the following is a specification.

My invention relates to improvements in control systems for internal combustion engines, and its object is to use two sources of power, one electrical and the other fluid pressure, both of which may if desired be generated by the engine itself for starting the engine in either direction for controlling its speed and stopping the engine.

A further object is to so arrange and connect the various parts of the system that the engine control may be attained by the manipulation of a simple switch located at any desired point.

Other features and objects of the invention will appear in the following specification in which I will describe the construction and arrangement of certain apparatus which may be used in carrying out my invention, and will point out the novel features of the invention in appended claims.

Referring to the drawings.

Like characters of reference designate corresponding parts in all of the figures.

Figure 1:
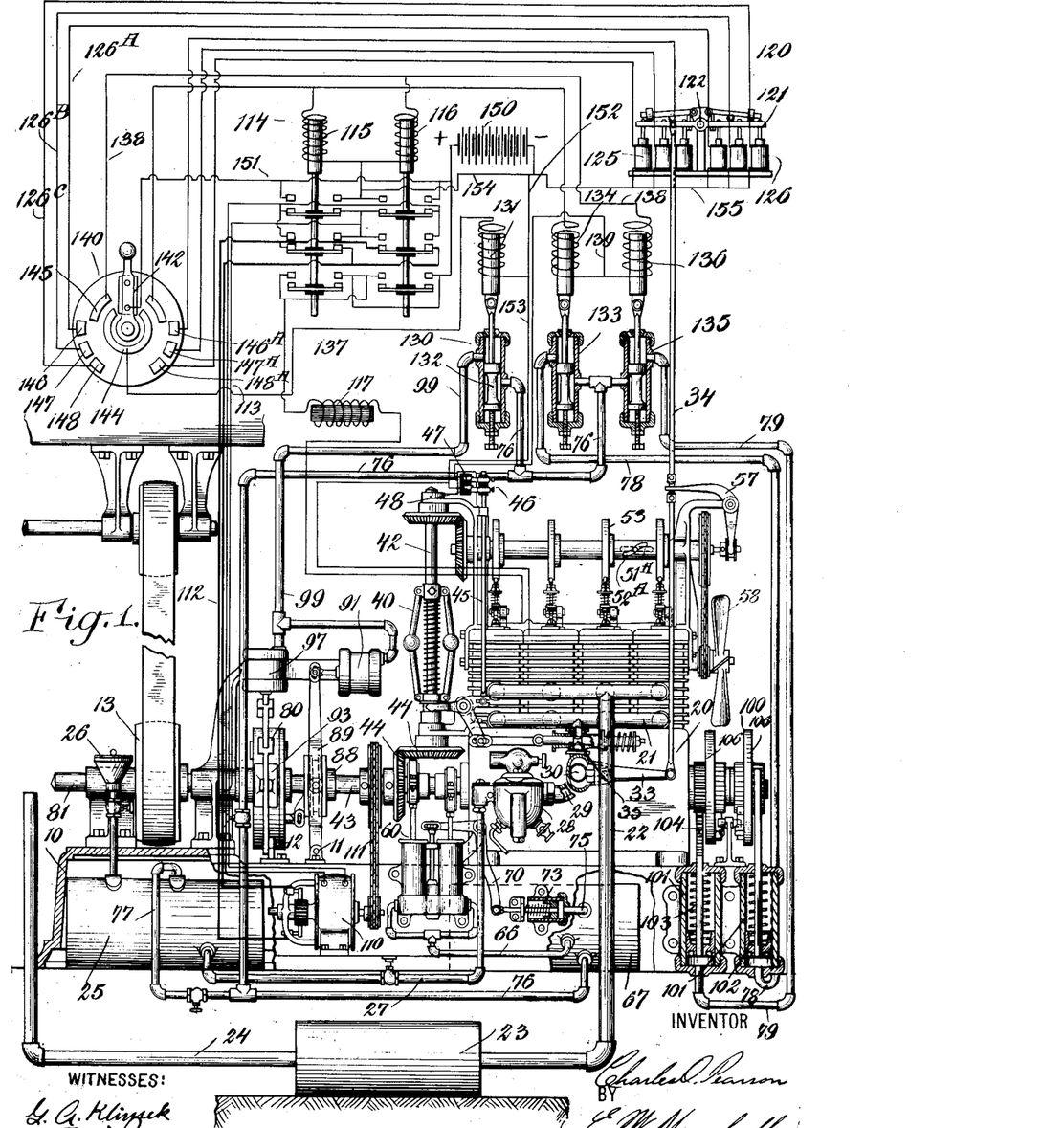
Figure 1 is a side elevation of a gasolene engine and associated parts, some of which are shown in section, together with certain electrical apparatus with its connecting circuits shown diagrammatically.

10 designates a base-plate upon which an engine 20 and some of its associated parts are mounted.

21 is the engine inlet; 22 its outlet or exhaust, which, after passing through a muffler 23, may be led off by a pipe 24 to a chimney or stack, or to some other desired point.

25 is a gasolene tank which is shown within the base 10.

26 is its filling inlet, and 27 a supply pipe leading from the tank to a carbureter 28.

29 is a pipe connection between the carbureter and the engine inlet 21.

Figures 7, 8, 9, 10, 11, 12:
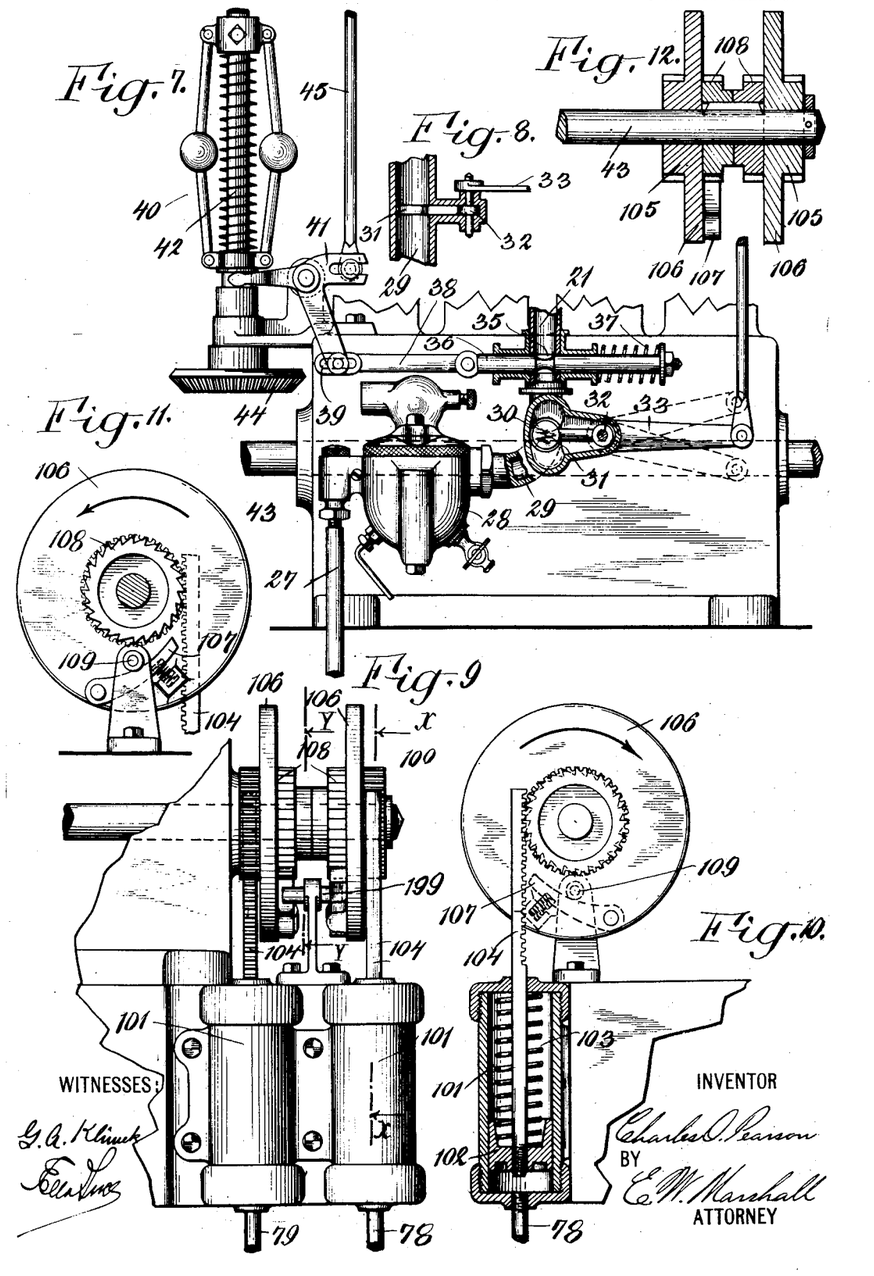
Fig. 7 is a side elevation of a carbureter and its controlling valves, together with a speed governor and other connected parts. Some of these parts are shown in section.
Fig. 8 is a sectional plan view of one of these controlling valves.
Fig. 9 is a side elevation of a fluid pressure starting device for the engine.
Fig. 10 is a sectional end elevation of this starting device, the section being taken on the line X—X of Fig. 9.
Fig. 11 is another sectional end elevation of the starting device, the section in this figure being taken on the line Y—Y of Fig. 9.
Fig. 12 is a sectional side elevation of a pair of gears and other parts on the end of the engine shaft, which parts form a portion of the starting device.

30 is a throttle valve which is shown somewhat in detail in Figs. 7 and 8. It comprises a shutter 31 which is pivoted at 32 and arranged to be actuated by the lever 33 and a vertical connecting rod 34. In its central position the shutter 31 partly closes the passage from the carbureter to the engine but opens this passage wider as it is moved to one side or the other. 35 is another throttle valve in this same passage which comprises a valve piston 36 with a spring 37 arranged to move it in one direction. One of its ends is connected by a link 38 with a pivoted bell-crank lever 41 by a lost motion connection 39.

40 is a centrifugal governor mounted on a vertical shaft 42 which is driven from the engine shaft 43 through a pair of bevel gears 44, 44. The bell-crank lever is also connected by a rod 45 to actuate a switch 46 which is arranged to open an electric circuit between stationary contacts 47 and 48 whenever the speed of the engine has reached a predetermined rate. A bevel-gear 49 on the vertical shaft 42 is in mesh with a similar gear 50 on the end of a horizontal shaft 51, which is therefore driven thereby and which is arranged to actuate the spark mechanism for the engine.

Figure 2:
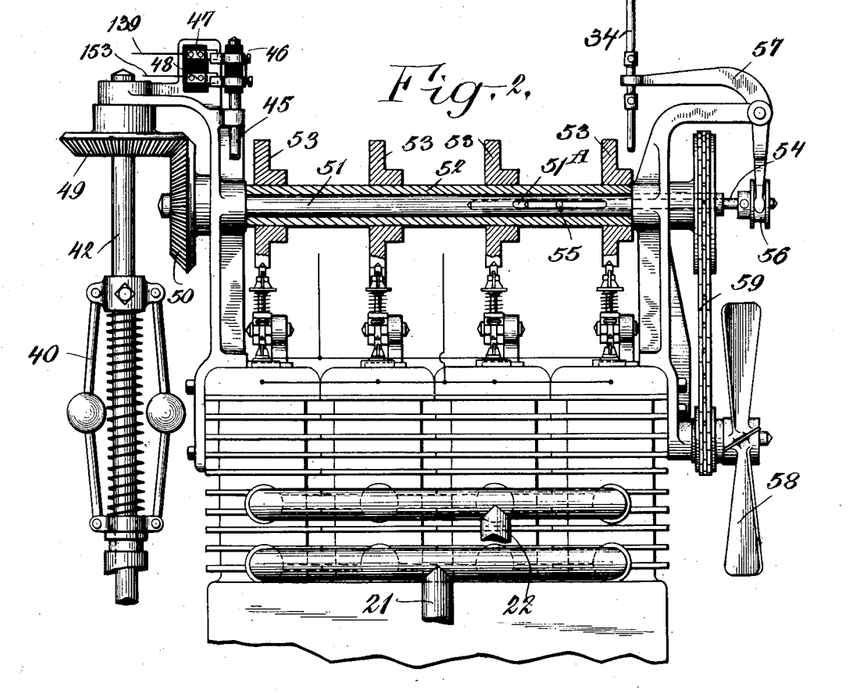
Fig. 2 is a side elevation of the upper portion of the engine and some of its connected mechanisms and with a part of its sparking apparatus drawn in section.
Figures 3, 4, 5, 6:
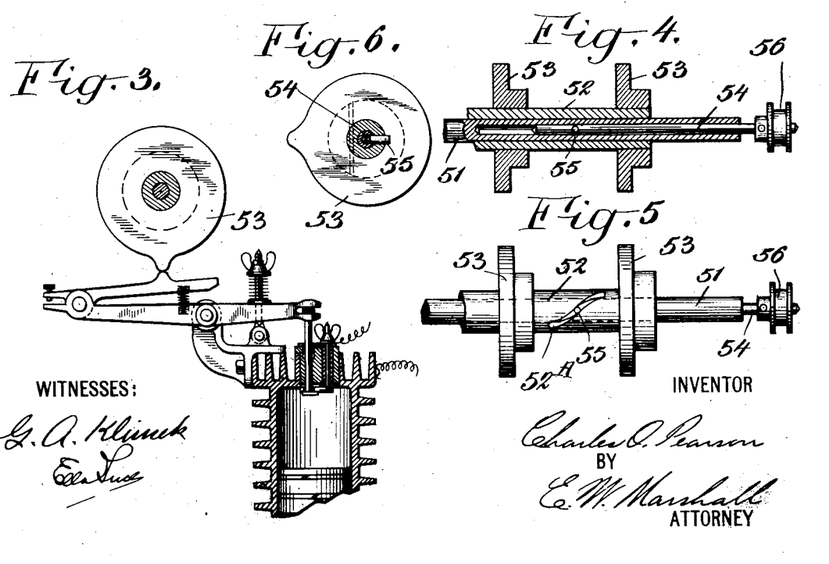
Fig. 3 is an end view of a part of this sparking apparatus with a portion of one of the engine cylinders shown in section.
Figs. 4 and 5 are a sectional plan and a side elevation of a detail of the spark mechanism.
Fig. 6 shows one of the spark device cams in end view.

52 is a bushing upon shaft 51 which carries a plurality of cams 53 corresponding in number with the number of cylinders of the engine, in this case four. One end of the shaft is drilled out for the reception of a slidable rod 54 which carries a pin 55. This pin projects through a straight slot 51$^A$ in the shaft 51 and a curved slot 52$^A$ in the bushing 52. A grooved collar 56 is affixed to the outer end of rod 54, and a pivoted lever 57 engages with this collar. By means of this lever the rod 54 may be moved into or out of the shaft 51, and by this movement and the engagement of pin 55 with slot 52$^A$, the collar 52 and its cams 53 may be rotated a limited amount upon the shaft 51 in one direction or the other for the purpose of advancing or retarding the spark mechanism of the engine. One form of spark mechanism is shown in Fig. 3, but I will not describe it herein as it is well known and forms no part of my invention.

The engine cylinders as herein shown are of the air-cooled type, and 58 designates a fan for creating an air circulation about these cylinders. The fan is arranged to be driven by a sprocket-chain 59 from a sprocket-wheel on the end of shaft 51.

Figure 13:
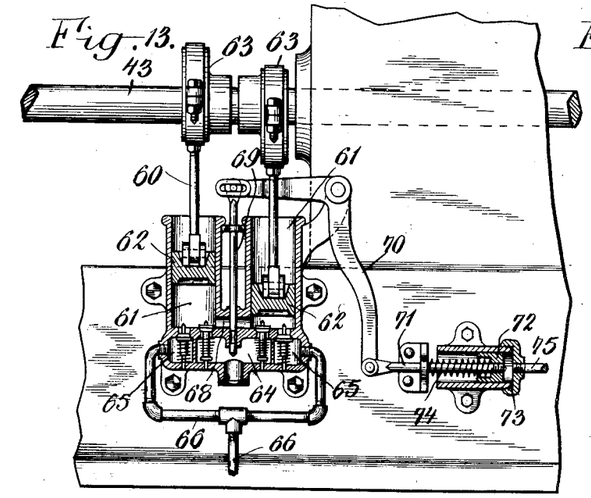
Fig. 13 is a sectional side elevation of a fluid pressure pump and pressure regulator.
Figure 14:
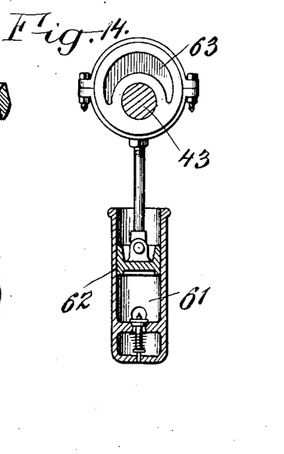
Fig. 14 is a sectional end elevation of the fluid pressure pump.

60 is a fluid pressure pump which comprises a pair of cylinders 61 in which are pistons 62 driven by eccentrics 63 on the engine shaft 43.

64 is an air inlet chamber from which are passages controlled by check-valves leading into the lower ends of cylinders 61.

65, 65 are air outlet chambers into which are passages controlled by check valves from the cylinders 61. A pipe 66 connects these passages with a pressure tank 67.

68 is a passage between the lower end of the two cylinders 61.

69 is a piston valve which normally closes this passage but which may be raised to open it.

70 is a bell-crank lever connected with the upper end of this piston valve. Its other end is connected by a rod 71 with a piston 72 within a cylinder 73.

74 is a compression spring arranged to press this piston valve in.

75 is a pipe between the pressure tank 67 and the cylinder 73. These parts are so arranged that when the pressure in the tank reaches a predetermined amount the piston valve 69 will be raised thereby so that the passage 68 is opened. Air compressed in one of the cylinders 61 by the downward movement of its piston will then be free to pass into the other cylinder 61 while its piston is moved upward. Thus the work will be taken off of the pump and it will compress no more air or other fluid until the piston valve 69 again closes the passage 68, which it will do as soon as the pressure in the tank 67 drops.

76 is a pressure supply pipe from the tank 67 to various parts of the apparatus, which will be pointed out later. A branch pipe 77 from it leads to the gasolene tank 25 and supplies it with pressure.

Figure 15:
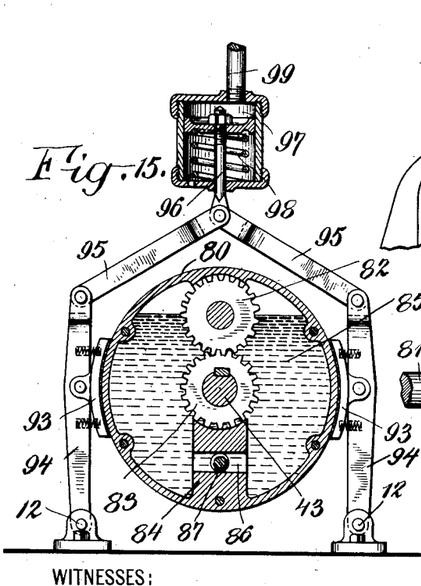
Fig. 15 is a sectional end elevation of a fluid pressure brake and clutch mechanism.
Figure 16:
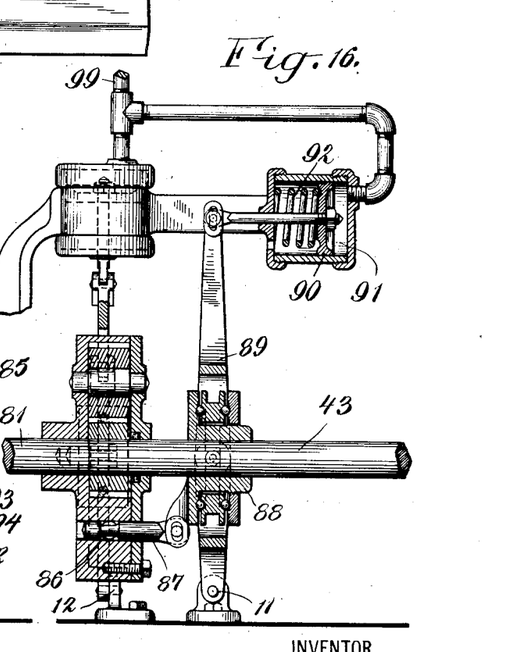
Fig. 16 is a sectional side elevation of the same parts.

In Figs. 15 and 16 a fluid pressure controlled brake and clutch device is shown. This comprises a circular housing 80 rigidly mounted upon a power transmission shaft 81, which is in alinement with the engine shaft 43. These shafts may be maintained in alinement by having a hub on the end of one of them project into a corresponding opening in the other.

82 is a gear rotatably supported by the housing and surrounded thereby. On the end of shaft 43 and keyed thereto is a similar gear 83 which is in mesh with the gear 82.

84 is an inwardly projecting portion of the housing which extends to and partially surrounds the teeth of gear 83. This projecting portion and the gears 82 and 83 divide the interior of the housing into two chambers which are filled or partially filled with oil or other liquid 85.

86 is a passage between the two chambers formed as above described, and this passage is controlled by a piston valve 87.

88 is a collar loosely mounted on the shaft 43 and connected with the piston valve 87.

89 is a lever pivoted at 11 to the base 10 and connected with the piston valve 87. To the upper end of this lever a piston 90 within a cylinder 91 is provided. A compression spring 92 is arranged to act against this passage to move it in one direction to slide the collar 88 along shaft 43 to open the passage 86. When in this position the rotation of shaft 43 will drive the gears 82 and 83 and cause the oil to be circulated through the passage 86. This will have no effect upon the housing 80, but if fluid pressure is admitted to cylinder 91 it will cause the piston valve 87 to close the passage 86. Now, as the gears are arranged to be oil-tight, the oil cannot circulate. Consequently the gears will be locked together and will cause the housing and the shaft 81 to rotate with the shaft 43.

93, 93 designate a pair of brake-shoes bearing upon the outer periphery of housing 80. These are supported upon brake-levers 94 which are pivoted in stationary brackets 12 on the base 10. Their upper ends are connected by levers 95 which are pivoted to the brake-levers and to a piston rod 96. This piston rod is affixed to a piston within a cylinder 97. A spring 98 pushes the piston and its connected parts upward to apply the brake-shoes. A pipe 99 is arranged to admit fluid pressure to the upper end of cylinder 97 to push the piston down against the spring to release the brake. A branch pipe leads to the cylinder 91 so that the clutch is actuated at the same time the brake is released.

100 designates a fluid pressure starting device for the engine. It comprises two cylinders 101 within which are pistons 102 which are pressed downward by springs 103. The upper ends of the piston rods are constructed to form toothed-racks which are in mesh with gear wheels 105 loosely mounted upon the engine shaft 43. One of these racks is on one side of one of the gears 105 and the other is on the opposite side of the other gear, so that the upward movement of one of the racks will drive its gear in one direction, while the upward movement of the other rack will drive its gear in the opposite direction. The inner portions of the gears 105 form flanges 106 on which are mounted pawls 107 which are spring-pressed inward to engage ratchet wheels 108 when their gear is rotated, but which are held out of engagement with the ratchet wheels by a stationary pin 109 when the pistons 102 are down. These ratchet-wheels are keyed to the engine shaft 43. When the fluid pressure is admitted to the bottom of one of the cylinders 101, it will push its toothed rack upward and, through the mechanism above described, will rotate the engine shaft in one direction. When the other rack is pushed upward the engine shaft will be driven in the opposite direction.

110 is an electrodynamic machine which is connected to run with the engine 20 by means of a sprocket-chain 111 running from sprocket-wheels on both the engine and armature shafts.

Figure 17:
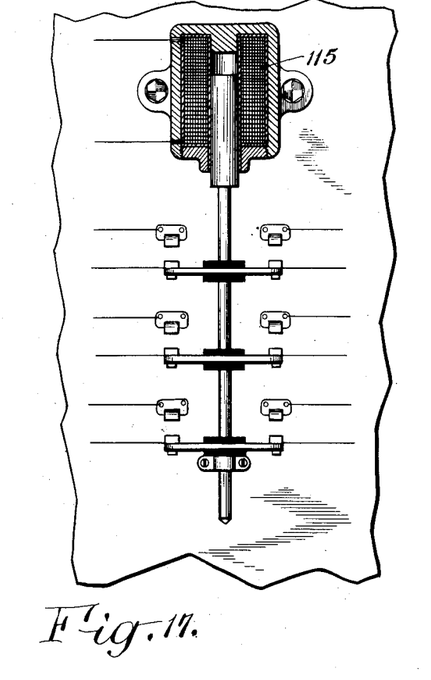
Fig. 17 is a sectional front elevation of a part of an electromagnetically actuated reversing switch which I use in conjunction with the other apparatus.

112 designates the leads from the armature of the electrodynamic machine, and 113 the leads from its field windings. These leads run to various contacts of a reversing switch 114 which comprises two actuating magnets 115 and 116, together with other connected parts. One of these magnets and its connected parts are shown somewhat in detail in Fig. 17.

Figure 18:
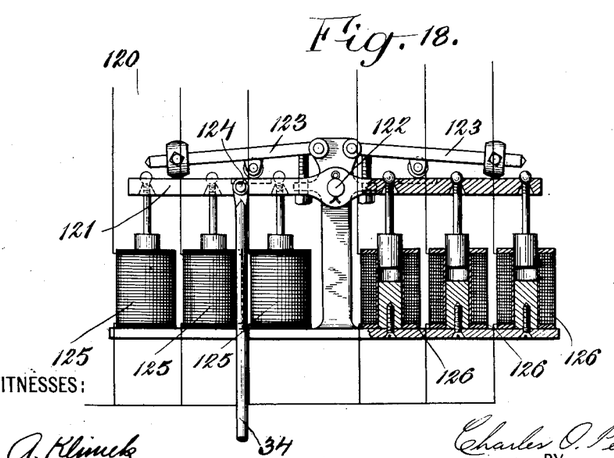
Fig. 18 is a side elevation, partly in section, of an electrically controlled governing mechanism.

In Fig. 18 I have shown an electrically controlled governing device 120 which comprises an arm 121 pivoted at 122 and arranged to be held in central position by a pair of weighted arms 123. The vertical connecting rod 34 which is connected to the throttle valve lever 33 and with the spark shifting lever 57 is pivotally attached to the arm 121 at 124. 125 designates a plurality of electromagnets or solenoids which are connected with the arm 121 at one side of its pivot, and 126 are other magnets connected with this arm at the other side of its pivot.

130 is an electrically controlled valve which comprises an electromagnet 131, the core of which is arranged to move a valve 132 whenever the magnet is energized to open the passage between the pressure supply pipe 76 and the pipe 99 which leads to the brake and clutch actuating mechanism. 133 is a similar valve which, when its magnet 134 is energized, will connect pressure supply pipe 76 with one of the starting device cylinders 101 through pipe 78, and 135 and 136 are a valve and its connected controlling magnet which are arranged to admit fluid pressure to the other starting device cylinder 101 through the pipe 79.

Figure 19:
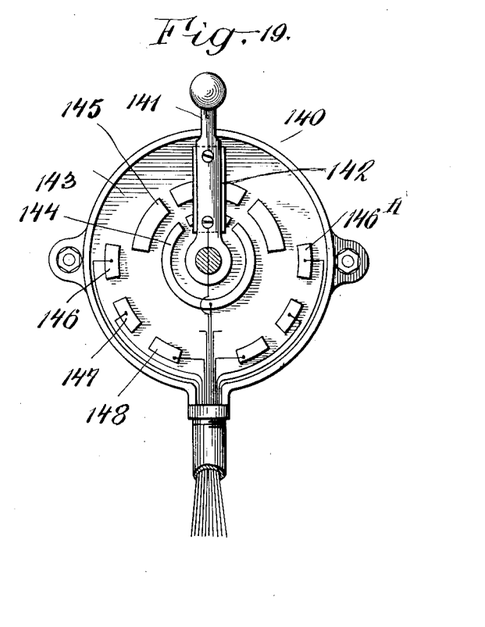
Fig. 19 is a front elevation of the controlling switch with its cover removed.

140 is a manually operated controlling switch which comprises a pivoted lever 141 which carries a movable contact 142 which is arranged to be moved onto the stationary contacts mounted upon an insulated base 143, which contacts I will point out in tracing the various circuits and in describing the operation of the apparatus.

150 is a storage battery, the two ends of which are designated by + and —, and which is connected with the various parts of the apparatus by circuits which will now be traced.

151 is a conductor leading from one end of the battery to the contact-plate 142 of the controlling switch. When an operator turns the lever of the controlling switch in either direction this contact 142 will be moved onto stationary contact 144 which, through conductor 137, will close a circuit through the winding of magnet 131 back to the battery by conductor 152. The valve 132 will then admit pressure from the pressure tank to cylinders 97 and 91, which will release the brake and throw in the clutch mechanism. If the operator turns the lever to the left, another circuit will be completed through contact 145 and conductor 138, through winding of magnet 136, and through conductor 139 to contact 47 of switch 46, through the switch and out by contact 48 and conductors 153 and 152 to the battery. This will connect the pressure tank through pipes 76 and 79 to one of the cylinders 101 of the starting device which will thereby be actuated and will rotate the engine shaft in one direction. This rotation of the engine shaft will cause the engine to draw in an explosive mixture which will be ignited by the spark mechanism which is connected through the reversing switch and through a spark coil 117 with the battery. The engine will then run under its own power and will drive the centrifugal governor 40 which, through the connection previously described, will open the switch 46, thereby cutting off the electrical supply from magnet 136. The valve 135 will then be closed so that the fluid pressure starting device will no longer be supplied with fluid pressure, and its piston will be driven back by the spring 103 to its initial position. At the same time a circuit will have been closed between contacts 142 and 145 of the controlling switch, conductor 138, through magnet 116 of the reversing switch, and back to the battery by conductor 154. This will cause the magnet 116 to be energized and to close the right-hand portion of the reversing switch 114, thereby connecting the armature leads of the electrodynamic machine and the leads from the field winding of the latter apparatus with the battery in such a direction as to cause it to rotate in the same direction as the rotation of the engine 20. The electrodynamic machine will then act as a motor and will drive the engine together with the movement which has been imparted thereto by the fluid pressure starting device 100. As soon, however, as the engine attains its normal speed the electrodynamic machine will be driven thereby at a sufficient rate of speed to cause it to generate current back into the battery 150 to thereby keep the battery charged. It may be seen from the circuits shown that the sparking devices on the engine cylinders will be connected through the reversing switch contacts through the spark coil 117 with the battery.

A further movement of the controlling switch lever will cause the contact 142 to be moved onto stationary contact 146. This, through conductor 126ᴬ, will close a circuit through one of the magnets 126 which is connected by the return-wire 155 with the battery. This magnet 126 will move the pivoted lever 121 and the connecting rod 34 to advance the spark mechanism actuating cams to cause the engine to run faster. It will at the same time open the throttle valve 30 to further increase the speed of the engine. Similarly, contact 142 of the controlling switch may be moved onto stationary contact 147 which will then close a circuit through conductor 126ᴮ through the second magnet 126 to move the pivoted arm 121 a further amount to further increase the speed of the engine. When the controlling switch is moved to its extreme position to the left a circuit will be closed through contacts 142 and 148, through conductor 126ᶜ to close a circuit through the third of the magnets 126 which, through the mechanical connections above pointed out, will further advance the spark mechanisms and will fully open the throttle valve 30. The engine will now attain its full speed which will be controlled by the centrifugal governor 40. This is so arranged that whenever the engine attains undue speed it will close the throttle valve 35 to prevent racing of the engine.

It may be seen that the rotation of the engine will be transmitted through its shaft 43 and the clutch mechanism to the power transmission shaft 81 upon which a pulley 13 may be mounted from which any desired mechanism may be driven.

The operator may at any time move the lever of the controlling switch back to de-energize any one of the magnets 126 which will then allow the connecting rod 34 to be moved back a desired amount to reduce the speed of the engine by means of the spark mechanism and the throttle valve 30 which it controls. When the operator brings the controlling switch lever back to its central position all of the electrical circuits will be broken so that the engine will no longer be provided with igniting sparks and it will come to rest, at the same time the brake will be applied and the clutch released.

It is evident that whenever the operator turns the lever of the starting switch to the right, similar operations to those above described will take place, but in this case the electrodynamic machine's leads will be connected to the battery in such a direction as to cause it to rotate in the opposite direction, and the other cylinder 101 of the fluid pressure starting device will be supplied with fluid pressure through the valve 133 and pipe 78 so that these two mechanisms will drive the engine in the opposite direction. The speed at which the engine is driven may be controlled through the magnets 125 of the electrically controlled governing mechanism 120, which magnets are controlled by contacts 146ᴬ, 147ᴬ, and 148ᴬ in the controlling switch.

By means of the apparatus above described a simple and positive control for an internal combustion engine is provided. In the preferred form both of the sources of power which are used for starting and controlling the movement of the engine are generated by the engine itself, for during the usual running of the engine the electrodynamic machine will act as a generator. The storage battery, as I have before pointed out, and the pressure pump 60 will be driven to supply fluid pressure which will be stored in the tank 67 until used for the purpose of releasing the brake, actuating the clutch, and energizing the fluid pressure starting device. It has hitherto been difficult to start and control engines of this type which are otherwise efficient and desirable, and as this system provides means for overcoming these difficulties, it will greatly enhance the value of engines of this type.

In the drawings, I have shown the engine 20 as a four-cylinder, two-cycle gasolene engine, but of course the invention is not limited to engines of this type as it is intended for use in conjunction with other types of internal combustion engines and in fact may be applied by any one skilled in the art with nearly any form of engine or motor which is not self-started.

The various mechanisms which I have shown are intended merely to illustrate one manner in which the invention may be carried into effect, but many variations in these arrangements may be made without departing from the spirit of the invention which is intended to broadly include any combination of parts by means of which two sources of power external to the engine may be used to control the engine.

Two supplies of energy generated by the engine and used for its control are shown but it is evident that either or both of these supplies may be obtained from some other source. When the control is to be effected from a distant point, electrical circuits are desirable as they may be carried any desired distance from the engine and current made to act directly upon the lighter moving controlling parts of engine and upon the heavier moving controlling parts of the engine through auxiliary mechanisms which may be placed nearer the engine. I have adopted the fluid pressure devices for these auxiliary mechanisms as they may be compact and powerful. The fluid pressure may be air, water, oil or other forms of fluid which may be stored under pressure. The control of the engine includes starting in either direction, controlling its speed and power which may be accomplished as has been shown, by acting upon its fuel supply and its sparking mechanism. This system also controls the mechanism which the engine drives.

What I claim is—

1. An internal combustion engine, a fluid pressure supply and an electrical supply, means actuated by both of said supplies of energy for starting the engine and by one of said supplies for controlling the speed thereof, and manual means for controlling said supplies.

2. An internal combustion engine, a fluid pressure supply and an electrical supply, means actuated by both of said supplies for starting the engine in either direction and by one of said supplies for controlling the speed thereof, and manual means for controlling said supplies.

3. An internal combustion engine, a fluid pressure supply and an electrical supply, means actuated by both of said supplies of energy for starting the engine in either direction and by one of said supplies for controlling the speed thereof, and a manually operated switch at a point removed from the engine connected directly with one of said supplies of energy and indirectly with the other of said supplies, and arranged to control both of said supplies of energy.

4. An internal combustion engine, means driven thereby for generating a supply of fluid pressure, other means driven by the engine for generating a supply of electrical energy, and a control system for the engine, and means for actuating said control system by both of said supplies.

5. An internal combustion engine, means driven thereby for generating a supply of fluid pressure, other means driven by the engine for generating a supply of electrical energy, and means actuated by both of said supplies for starting the engine in either direction; a control system for the engine, said control system being arranged to be actuated by said supplies, and a manually operated switch for controlling both of said supplies of energy from a point removed from the engine.

6. An internal combustion engine, a pressure pump connected therewith and arranged to generate a fluid pressure supply, an electrodynamic machine connected with the engine and arranged to generate a supply of electrical energy, a fluid pressure starting device for the engine, and electromagnetic means for connecting the fluid pressure supply with the starting device, said electromagnetic means being actuated by the electrical supply.

7. An internal combustion engine, a pressure pump connected therewith and arranged to generate a fluid pressure supply, an electrodynamic machine connected with the engine and arranged to generate a supply of electrical energy, a fluid pressure starting device for the engine, an electromagnetically actuated valve for connecting the fluid pressure supply with the starting device, said valve being actuated by the electrical supply, and a manually operated switch for controlling said valve.

8. An internal combustion engine, a pressure pump connected therewith and arranged to generate a fluid pressure supply, an electrodynamic machine connected with the engine and arranged to generate a supply of electrical energy, a fluid pressure starting device for the engine comprising a cylinder and connecting mechanism for starting the engine in one direction, and a cylinder and connecting mechanism for starting the engine in the opposite direction, and means for rendering one of said connecting mechanisms inoperative while the other of said mechanisms is used, an electromagnetically actuated valve for connecting the fluid pressure supply with the starting device, said valve being actuated by the electrical supply, and a manually operated switch for controlling said valve.

9. An internal combustion engine, a pressure pump connected therewith and arranged to generate a fluid pressure supply, an electrodynamic machine connected with the engine and arranged to generate a supply of electrical energy, a fluid pressure starting device for the engine, said electrodynamic machine being arranged to be run as a motor to start the engine, means for connecting the fluid pressure supply with the starting device, means for connecting the electrical supply with the electrodynamic machine to start the engine, and manual means for controlling both of said supplies.

10. An internal combustion engine, a pressure pump connected therewith and arranged to generate a fluid pressure supply, an electrodynamic machine connected with the engine and arranged to generate a supply of electrical energy, a fluid pressure starting device for the engine, said electrodynamic machine being arranged to be run as a motor to start the engine and to assist the engine in driving its load, a valve for connecting the fluid pressure supply with the starting device, a switch for connecting the electrical supply with the electrodynamic machine to start the engine in either direction, and a manually operated switch for controlling both of said supplies from a point removed from the engine.

11. An internal combustion engine, a pressure pump connected therewith and arranged to generate a fluid pressure supply, an electrodynamic machine connected with the engine and arranged to generate a supply of electrical energy, a fluid pressure starting device for the engine, a valve for connecting the fluid pressure supply with the starting device, said valve being energized by the electrical supply, manual means for controlling said valve, and means for automatically closing said valve when the engine reaches a predetermined speed.

12. An internal combustion engine, a pressure pump connected therewith and arranged to generate a fluid pressure supply, an electrodynamic machine connected with the engine and arranged to generate a supply of electrical energy, a fluid pressure starting device for the engine, an electromagnetically actuated valve for connecting the fluid pressure supply with the starting device, said valve being energized by the electrical supply, a manually operated switch for controlling said valve, and a switch arranged to be actuated by the engine for automatically closing said valve and thereby disconnecting the starting device when the engine reaches a predetermined speed.

13. An internal combustion engine, a pressure pump connected therewith and arranged to generate a fluid pressure supply, an electrodynamic machine connected with the engine and arranged to generate a supply of electrical energy, a fluid pressure starting device for the engine, an electromagnetically actuated valve for connecting the fluid pressure supply with the starting device, said valve being energized by the electrical supply, and a centrifugal governor arranged to control the speed of the engine, and to automatically open said valve when the engine reaches a predetermined speed.

14. An internal combustion engine, a pressure pump connected therewith and arranged to generate a fluid pressure supply, an electrodynamic machine connected with the engine and arranged to generate a supply of electrical energy, a fluid pressure starting device for the engine, an electromagnetically actuated valve for connecting the fluid pressure supply with the starting device, said valve being energized by the electrical supply, a centrifugal governor, a manually operated electric switch for controlling said connecting valve, a throttle valve for the engine, and a centrifugal governor arranged to actuate the throttle valve to control the speed of the engine and to close said connecting valve when the engine reaches a predetermined speed.

15. An internal combustion engine, a pressure pump connected therewith and arranged to generate a fluid pressure supply, an electrodynamic machine connected with the engine and arranged to generate a supply of electrical energy, means actuated by the fluid pressure supply for forcing a fuel supply to the engine, and means actuated by the electrical supply for controlling the admission of said fuel supply to the engine.

16. An internal combustion engine, a pressure pump connected therewith and arranged to generate a fluid pressure supply, an electrodynamic machine connected with the engine and arranged to generate a supply of electrical energy, means for supplying the engine with fuel, said fuel supply being conjunctively controlled by both the fluid pressure supply and the supply of electrical energy.

17. An internal combustion engine, a pressure pump connected therewith and arranged to generate a fluid pressure supply, an electrodynamic machine connected with the engine and arranged to generate a supply of electrical energy, means actuated by the fluid pressure supply for carrying a fuel supply to the engine, a speed controlling valve for the engine, and an actuator comprising a plurality of electromagnets for moving said valve, said magnets being arranged to be energized by said supply of electrical energy.

18. An internal combustion engine, a pressure pump connected therewith and arranged to generate a fluid pressure supply, an electrodynamic machine connected with the engine and arranged to generate a supply of electrical energy, said supplies being arranged to conjunctively start the engine in either direction, a sparking device for the engine, and an electromagnetic actuator for shifting the sparking device in one direction when the engine is running in one direction, and in the other direction when the engine is running in the opposite direction, to control the speed of the engine.

19. An internal combustion engine, a pressure pump connected therewith and arranged to generate a fluid pressure supply, an electrodynamic machine connected with the engine and arranged to generate a supply of electrical energy, means actuated by the fluid pressure supply for carrying a fuel supply to the engine, a valve for controlling the admission of the fuel supply to the engine, an actuator comprising a plurality of electromagnets arranged to move said valve in a plurality of steps, said magnets being energized from the electrical supply, and a manually operated switch for controlling said magnets.

20. An internal combustion engine, a pressure pump connected therewith and arranged to generate a fluid pressure supply, an electrodynamic machine connected with the engine and arranged to generate a supply of electrical energy, a sparking device for the engine, an actuator comprising a plurality of magnets energized from the electrical supply arranged to shift the sparking device in a plurality of steps to control the speed of the engine, and manual means for controlling said magnets.

21. An internal combustion engine, a pressure pump connected therewith and arranged to generate a fluid pressure supply, an electrodynamic machine connected with the engine and arranged to generate a supply of electrical energy, means actuated by the fluid pressure supply for carrying a fuel supply to the engine, a valve for the engine, an actuator comprising a plurality of magnets energized by the electrical supply for moving said valve, each of said magnets being arranged to positively move the actuator and valve through different distances, and manual means for controlling said magnets.

22. An internal combustion engine, a pressure pump connected therewith and arranged to generate a fluid pressure supply, an electrodynamic machine connected with the engine and arranged to generate a supply of electrical energy, means actuated by the fluid pressure supply for carrying a fuel supply, and an actuator comprising a plurality of magnets arranged to shift the sparking device and to move said valve to thereby control the speed of the engine.

23. An internal combustion engine, a pressure pump connected therewith and arranged to generate a fluid pressure supply, an electrodynamic machine connected with the engine and arranged to generate a supply of electrical energy, means actuated by the fluid pressure supply for carrying a fuel supply to the engine, a sparking device for the engine, a valve for the fuel supply, an actuator comprising a plurality of magnets energized from the electrical supply arranged to shift the sparking device and to move said valve in a plurality of steps to control the speed of the engine, and means for controlling said magnets and actuator at will.

24. An internal combustion engine, a pressure pump connected therewith and arranged to generate a fluid pressure supply, an electrodynamic machine connected with the engine and arranged to generate a supply of electrical energy, a throttle valve, a centrifugal governor arranged to control said throttle valve, an independent speed controlling valve, and manually controlled means energized by said electrical supply for controlling the movement of said speed controlling valve, said throttle valve and speed controlling valve being arranged to control the speed of the engine.

25. An internal combustion engine, a pressure pump connected therewith and arranged to generate a fluid pressure supply. an electrodynamic machine connected with the engine and arranged to generate a supply of electrical energy, a sparking device for the engine, a throttle valve, a centrifugal governor arranged to control said throttle valve, a speed controlling valve for the engine, an electromagnetic actuator energized from the electrical supply for shifting the sparking device and moving the speed controlling valve step by step to control the speed of the engine, and manual means for controlling said actuator.

26. An internal combustion engine, a pressure pump connected therewith and arranged to generate a fluid pressure supply, an electrodynamic machine connected with the engine and arranged to generate a supply of electrical energy, a power transmission shaft, a clutch for connecting said shaft with the engine, means energized by the pressure supply for actuating said clutch, and means energized by the electrical supply for controlling the pressure actuating device.

27. An internal combustion engine, a pressure pump connected therewith and arranged to generate a fluid pressure supply, an electrodynamic machine connected with the engine and arranged to generate a supply of electrical energy, a power transmission shaft, a clutch for connecting said shaft to the engine, a brake for said shaft, means energized by the pressure supply for actuating said clutch and brake, and means actuated by the electrical supply for controlling the pressure actuating device.

28. An internal combustion engine, a pressure pump connected therewith and arranged to generate a fluid pressure supply, an electrodynamic machine connected with the engine and arranged to generate a supply of electrical energy, a power transmission shaft, a clutch for connecting said shaft with the engine, a brake for said shaft, means energized by the pressure supply for controlling the clutch and brake, means energized by the electrical supply for controlling the pressure supply controlling means, and manual means for controlling said electrical control means from a point removed from the engine.

29. An internal combustion engine, a pressure pump connected therewith and arranged to generate a fluid pressure supply, an electrodynamic machine connected with the engine and arranged to generate a supply of electrical energy, a power transmission shaft, a clutch for connecting said shaft to the engine, a brake for said shaft, an electromagnetically actuated valve for actuating the clutch and the brake, means energized by the electrical supply for controlling said valve, and a manually operated switch for controlling said valve from a point removed from the engine.

30. An internal combustion engine, a pressure pump connected therewith and arranged to generate a fluid pressure supply, an electrodynamic machine connected with the engine and arranged to generate a supply of electrical energy, a fluid pressure starting device for the engine controlled by said electrical supply, and a reversing switch arranged to connect said electrical supply with the electrodynamic machine to cause said supply to run the electrodynamic machine in either direction as a motor.

31. An internal combustion engine, a pressure pump connected therewith and arranged to generate a fluid pressure supply, an electrodynamic machine connected with the engine and arranged to generate a supply of electrical energy, a fluid pressure starting device for the engine, an electromagnetic device for connecting the pressure supply with the starting device, a reversing switch arranged to connect said electrical supply with the electrodynamic machine to cause said supply to run said electrodynamic machine in either direction as a motor, said reversing switch being also arranged to control the electromagnetic device.

32. An internal combustion engine, a pressure pump connected therewith and arranged to generate a fluid pressure supply, an electrodynamic machine connected with the engine and arranged to generate a supply of electrical energy, a fluid pressure starting device for the engine, an electromagnetic device for connecting the pressure supply with the starting device, a sparking device for the engine, a reversing switch arranged to connect the electrical supply with the electrodynamic machine to cause said supply to run said electrodynamic machine in either direction as a motor, said reversing switch being also arranged to control the electromagnetic device and the sparking device.

33. An internal combustion engine, a pressure pump connected therewith and arranged to generate a fluid pressure supply, an electrodynamic machine connected with the engine and arranged to generate a supply of electrical energy, a battery for storing said electrical energy, a fluid pressure starting device for the engine, an electromagnetic device for connecting the pressure supply with the starting device, a sparking device for the engine, a reversing switch arranged to connect the battery with the electrodynamic machine to cause said electrical supply to run said electrodynamic machine in either direction as a motor, said reversing switch being also arranged to control the circuits for the electromagnetic device and the sparking device.

34. An internal combustion engine, a pressure pump connected therewith and arranged to generate a fluid pressure supply, an electrodynamic machine connected with the engine and arranged to generate a supply of electrical energy, a fluid pressure starting device for the engine, an electromagnetically actuated valve for connecting the fluid pressure supply with the starting device to cause the starting device to run the engine in one direction, another electromagnetically actuated valve for connecting the fluid pressure supply with the starting device to cause the starting device to run the engine in the opposite direction, a power transmission shaft, a clutch for connecting said shaft with the engine, a brake for said shaft, an electromagnetically actuated valve for acuating the clutch and the brake, all of said valves being actuated by the electrical supply, and a manually operated switch for controlling said valves.

35. An internal combustion engine, a pressure pump connected therewith and arranged to generate a fluid pressure supply, an electrodynamic machine connected with the engine and arranged to generate a supply of electrical energy, a fluid pressure starting device for the engine, said electrodynamic machine being arranged to start the engine in either direction and to assist the engine in driving its load, an electromagnetically actuated valve for connecting the fluid pressure supply with the starting device to cause the starting device to run the engine in one direction, another electromagnetically actuated valve for connecting the fluid pressure supply with the starting device to cause said starting device to run the engine in the opposite direction, circuits for said valves, a reversing switch for connecting the electrical supply with the electrodynamic machine, and a manually operated switch for controlling said valves and said switch.

36. An internal combustion engine, a pressure pump connected therewith and arranged to generate a fluid pressure supply, an electrodynamic machine connected with the engine and arranged to generate a supply of electrical energy, a fluid pressure device for the engine, a throttle valve, a centrifugal governor arranged to actuate the throttle valve, said electrodynamic machine being arranged to start the engine in either direction and to assist the engine in driving its load, an electromagnetically actuated valve for connecting the fluid pressure supply with the starting device to cause the starting device to run the engine in one direction, another electromagnetically actuated valve for connecting the fluid pressure supply with the starting device to cause said starting device to run the engine in the opposite direction, circuits for said valves, a reversing switch for connecting the electrical supply with the electrodynamic machine, an electromagnetic actuator arranged to control the speed of the engine, and a manually operated switch for controlling said valves, said switch and said actuator.

37. An internal combustion engine, a pressure pump connected therewith and arranged to generate a fluid pressure supply, an electrodynamic machine connected with the engine and arranged to generate a supply of electrical energy, a reversible fluid pressure starting device for the engine, a throttle valve for the engine, a centrifugal governor arranged to control said throttle valve, said electrodynamic machine being arranged to start the engine in either direction and to assist the engine in driving its load, an electromagnetically actuated valve for connecting the fluid pressure supply with the starting device to cause the starting device to run the engine in one direction, another electromagnetically actuated valve for connecting the fluid pressure supply with the starting device to cause said starting device to run the engine in the opposite direction, a sparking device for the engine, circuits for said valves, a reversing switch arranged to connect the electrical supply with the electrodynamic machine and to control the electrical supply to the sparking device and the circuits for said valves, an electromagnetic actuator for controlling the speed of the engine, and a manually operated switch for controlling said valves, said reversing switch and said actuator.

38. An internal combustion engine, a pressure pump connected therewith and arranged to generate a fluid pressure supply, an electrodynamic machine connected with the engine and arranged to generate a supply of electrical energy, a fluid pressure starting device for the engine, a throttle valve for the engine, a centrifugal governor driven by the engine and arranged to control said throttle device, said electrodynamic machine being arranged to start the engine in either direction and to assist the engine in driving its load, an electromagnetically actuated valve for connecting the fluid pressure supply with the starting device to cause the starting device to run the engine in one direction, another electromagnetically actuated valve for connecting the fluid pressure supply with the starting device to cause said starting device to run the engine in the opposite direction, circuits for said valves, a cut-out switch automatically actuated by said governor for breaking said valve circuits when the engine has reached a predetermined speed, a reversing switch for connecting the electrical supply with the electrodynamic machine, an electromagnetic actuator for controlling the speed of the engine, and a manually operated switch for controlling said valves, said reversing switch, and for moving the actuator step by step.

39. An internal combustion engine, a fluid pressure supply, an electrical supply, a power transmission shaft, a clutch for connecting said shaft with the engine, means energized by the pressure supply for actuating said clutch, and means energized by the electrical supply for controlling the pressure actuating device.

40. An internal combustion engine, a fluid pressure supply, an electrical supply, a power transmission shaft, a clutch for connecting said shaft to the engine, a brake for said shaft, an electromagnetically actuated valve for connecting the fluid pressure to actuate the clutch and the brake, means energized by the electrical supply for controlling said valve, and a manually operated switch for controlling said valve from a point removed from the engine.

41. An internal combustion engine, a fluid pressure supply, an electrical supply, a starting device for the engine arranged to be actuated by said fluid pressure, a reversing switch arranged to connect said electrical supply with the electrodynamic machine to cause said supply to run the electrodynamic machine in either direction as a motor.

42. An internal combustion engine, a fluid pressure supply, an electrical supply, a fluid pressure starting device for the engine, an electromagnetic device for connecting the pressure supply with the starting device, a reversing switch arranged to connect said electrical supply with the electrodynamic machine in either direction as a motor, said reversing switch being also arranged to control the electromagnetic device.

43. An internal combustion engine, a fluid pressure supply, an electrical supply, a manually operated controlling circuit closer at a point removed from the engine, auxiliary fluid pressure mechanisms controlled by said circuit closer and arranged to transmit the manual operation to the engine.

44. An internal combustion engine, a fluid pressure supply, an electrical supply, means for electrically controlling the fluid pressure supply, to cause said supply to start the engine, and manual means for manually controlling said electrical supply.

45. An internal combustion engine, a fluid pressure supply, an electrical supply, a manually operated circuit closer, auxiliary fluid pressure devices electromagnetically controlled from said circuit closer, some of said fluid pressure devices being arranged to effect the starting of the engine in one direction, the others of said fluid pressure devices being arranged to effect the starting of the engine in the reverse direction, and an electromagnetically actuated reversing switch between the circuit closer and said auxiliary fluid pressure devices.

46. An internal combustion engine, a fluid pressure supply, an electrical supply, fluid pressure devices arranged to start the engine, electromagnetic devices for controlling the speed of the engine, and a manually operated circuit closer arranged to control said fluid pressure and electromagnetic devices.

47. An internal combustion engine, a fluid pressure supply, an electrical supply, a fuel supply for the engine, fluid pressure devices arranged to start the engine in either direction, an electromagnetic device arranged to control the admission of the fuel to the engine, and a manually operated circuit closer arranged to control said starting devices and said fuel control device.

48. An internal combustion engine, a fluid pressure supply, an electrical supply, a fuel supply for the engine, fluid pressure devices arranged to start the engine in either direction, an electromagnetic device arranged to control the admission of the fuel to the engine when running in either direction, an electromagnetically actuated reversing switch through which the control of the starting devices and the fuel control device is effected.

49. An internal combustion engine, a fluid pressure supply, an electrical supply, a fuel supply and an ignition mechanism for the engine, regulating means for admitting the fuel to the engine, a starting device for the engine, and means whereby said fluid pressure supply and said electrical supply are conjunctively used to control the starting device, the sparking mechanism and the fuel supply regulating means.

50. An internal combustion engine, a fluid pressure supply, an electrical supply, an ignition mechanism and a fuel supply for the engine, regulating means for admitting the fuel to the engine, a fluid pressure starting device for the engine, electromagnetic means for actuating the ignition mechanism and the fuel regulating means step-by-step and conjunctively and manual means for electrically controlling said electromagnetic means and the starting device.

51. An internal combustion engine, a fluid pressure supply, an electrical supply, an ignition mechanism and a fuel supply for the engine, regulating means for admitting the fuel to the engine, a fluid pressure starting device for the engine, electromagnetic means for actuating the ignition mechanism and the fuel regulating means step-by-step and conjunctively, manual means for electrically controlling said electromagnetic means and the starting device and a centrifugal governing device driven by the engine and arranged to independently act upon the fuel regulating means and to render said starting device inoperative while the engine is running.

52. An internal combustion engine, a fluid pressure supply, an electrical supply, mechanism arranged to be driven by said engine, a manually operated device for controlling said sources of energy and causing them to start the engine, to control the speed of the engine and to control said driven mechanism.

53. An internal combustion engine, a fluid pressure supply, an electrical supply, mechanism arranged to be driven by the engine, a control system for the engine energized by said fluid pressure and electrical supplies, and intermediate devices controlled and operated by said two supplies in conjunction with the engine control system whereby said driven mechanism may be connected with and disconnected from the engine.

54. An internal combustion engine, a fluid pressure supply, an electrical supply, mechanism arranged to be driven by the engine, a fluid pressure device for starting the engine under no load, fluid pressure connecting means for gradually placing the load of the driven mechanism upon the engine in proportion to the acceleration of the engine, and manually operated electrical means for conjunctively controlling the engine starting device and the connecting means for the driven mechanism.

55. An internal combustion engine, a fluid pressure supply, an electrical supply, mechanism arranged to be driven by the engine, a brake for said mechanism, a fluid pressure device for actuating said brake, electrical means for controlling the brake actuating device, a control system for the engine whereby said fluid pressure supply and electrical supply are conjunctively utilized to control the engine and the brake actuating and controlling devices.

56. An internal combustion engine, a fluid pressure supply, an electrical supply, fluid pressure devices for starting the engine in either direction, an electrical ignition mechanism for the engine, an electric circuit therefor, an electromagnetically actuated reversing switch through which the control of the starting device is effected, and a manually operated circuit closer for controlling the reversing switch, said reversing switch being provided with means for closing and opening the circuit through the sparking mechanism.

In testimony whereof I have signed my name to this specification in the presence of two subscribing witnesses.

CHARLES O. PEARSON.

Witnesses:
ERNEST W. MARSHALL,
ELLA TUCH.